Jan. 16, 1923.
A. GRILLI.
TIRE PROTECTOR.
FILED DEC. 8, 1921.
1,442,722
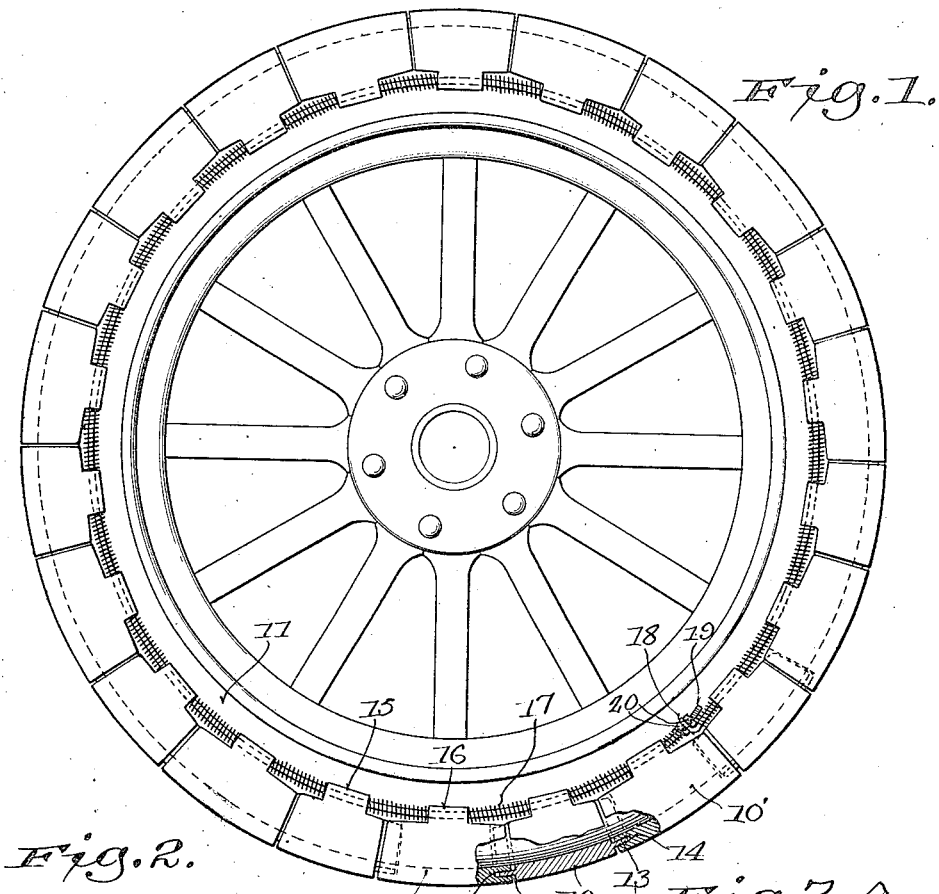
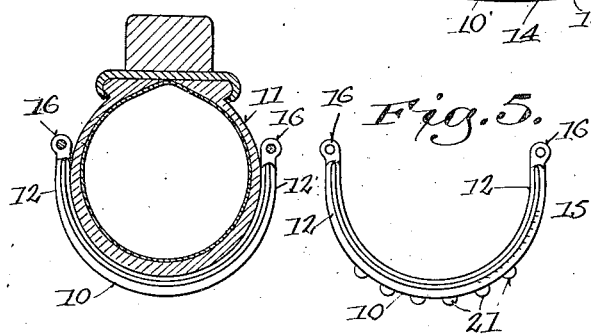
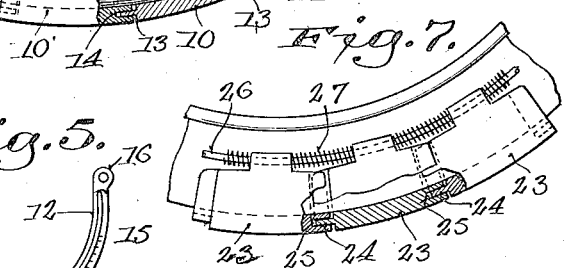
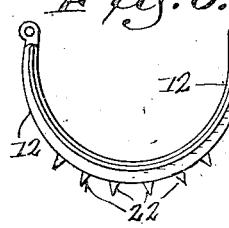
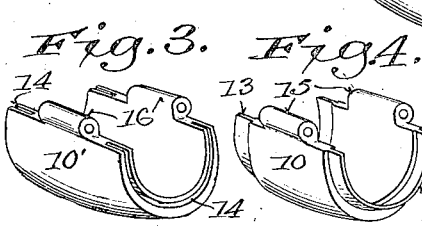
INVENTOR.
Angelo Grilli
BY Ralph W. Brown
ATTORNEY.

Patented Jan. 16, 1923.

1,442,722

UNITED STATES PATENT OFFICE.

ANGELO GRILLI, OF MILWAUKEE, WISCONSIN.

TIRE PROTECTOR.

Application filed December 8, 1921. Serial No. 520,800.

*To all whom it may concern:*

Be it known that I, ANGELO GRILLI, formerly a subject of the King of Italy, having taken out first papers for citizenship of the United States of America, residing at Milwaukee, in the county of Milwaukee and State of Wisconsin, have invented a certain new and useful Improvement in Tire Protectors, of which the following is a full, clear, concise, and exact description, reference being had to the accompanying drawings, forming a part of this specification.

This invention relates to tire protectors. One object of the present invention is the provision of a novel assemblage of metallic units designed to produce a substantially continuous flexible covering for the tread and side walls of the tire to protect it against punctures and other wear and tear without interfering with the natural cushioning qualities thereof.

Another object is generally to improve the construction and operation of devices of this character.

Other objects and advantages will hereinafter appear.

Embodiments of this invention are illustrated in the accompanying drawings in which:

Figure 1 is a side elevation, partly in section, of a tire protector constructed in accordance with the present invention.

Figure 2 is a sectional view, on a somewhat larger scale, taken substantially on the line 2—2 of Figure 1.

Figure 3 is a perspective view of one of the units employed.

Figure 4 is a perspective view of another of the units.

Figures 5 and 6 are sectional views of units having anti-skid treads.

Figure 7 is a fragmentary view of a tire protector of somewhat different form embodying features of the present invention.

Figure 8 is a perspective view of a unit employed in the tire protector of Figure 7.

The tire protector illustrated in Figures 1 to 4 comprises a series of metallic units 10—10′, connected to form a substantially continuous flexible cover enveloping the tread and side walls of a pneumatic tire 11 of standard construction. Each unit is preferably longitudinally curved and transversely arched to snugly embrace the tire, the side walls 12 of each, preferably extending somewhat above the center of the tire and slightly contracted, as shown in Figure 2, so as to cling thereto. The end portions of each unit 10 are preferably reduced to provide arcuate tongues 13 shaped to loosely engage within arcuate curfs 14 formed in the ends of the intermediate units 10′. These connections are such as to permit a slight endwise as well as lateral play between the several units to permit the units to automatically adjust themselves to changes in the contour of the tire.

The several units are maintained in assembled relation, preferably by a pair of wirings 15, threaded through ears 16, carried by the nuits. A pair of ears 16 are provided on each unit, these ears being formed as integral parts of the side walls thereof and extending upwardly therefrom. A series of coiled springs 17 carried by each wire 15 and interposed between the ears 16 of adjacent units yieldably maintain the units in proper end to end relation. One end of each wire 15 is bent to provide an eye 18 for receiving the other threaded end 19 thereof, the joint thus formed being secured by a pair of units 20 carried by the threaded end 19 and engaging the opposite sides of the eye 18.

The several units may be of the same or different lengths and they may have smooth exterior surfaces or roughened surfaces to increase the traction or to avoid skidding. The unit shown in Figure 5, for instance, is provided with rounded projections 21, such as might be found useful when driving over dirt roads, while that shown in Figure 6 is provided with pointed projections 22 particularly useful in driving through ice and snow.

The tire protector illustrated in Figures 7 and 8 is similar in many respects to that hereinabove described. In this instance, however, the several units 23 are of substantially identical form. Each is reduced at one end to form an arcuate tongue 24 while the other end is curfed, as at 25, to loosely receive the tongue of the next adjacent unit. Each of these units is also provided with ears 25 for receiving wire rings 26, such as those above described, for retaining the units in assembled relation. Springs 27 are also employed to yieldably maintain proper spacing of the units.

Thus it will be noted that the tire protectors described offer good protection for the tread as well as the side walls of the tire. In fact, so large a portion of the tire is covered as to render the tire practically bullet proof so that these protectors may be found particularly useful to the Government for war purposes.

At the same time, the connections between units are such as to permit sufficient flexibility so that the natural cushioning qualities of the tire are not impaired. Furthermore, by the use of the tongue and groove connections between units, sand and grit is effectively excluded from the interior of the protector.

Various changes may be made in the embodiments of the invention hereinabove described, without departing from or sacrificing any of the advantages of the invention as defined in the appended claims.

I claim:

1. A tire protector comprising a circular series of units shaped to snugly embrace the tread and side walls of a tire, tongue and groove connections between said units providing a substantially continuous enveloping ring for the tire and permitting relative longitudinal and transverse play between units, means including a closed ring connected with each of said several units for maintaining said units in assembled relation, and resilient spacer means carried by said ring for yieldably maintaining said units in proper end to end relation.

2. A tire protector comprising a circular series of units, each unit shaped to embrace the tread and side walls of a tire and having upstanding ears, tongue and groove connections between said units providing a substantially continuous but flexible enveloping ring for the tire, means including a flexible closed ring extending through said ears to maintain said units in assembled relation, and resilient means carried by said ring and interposed between the ears of adjacent units to maintain said units in proper end to end relation.

In witness whereof, I hereunto subscribe my name this 6th day of December, 1921.

ANGELO GRILLI.